UNITED STATES PATENT OFFICE.

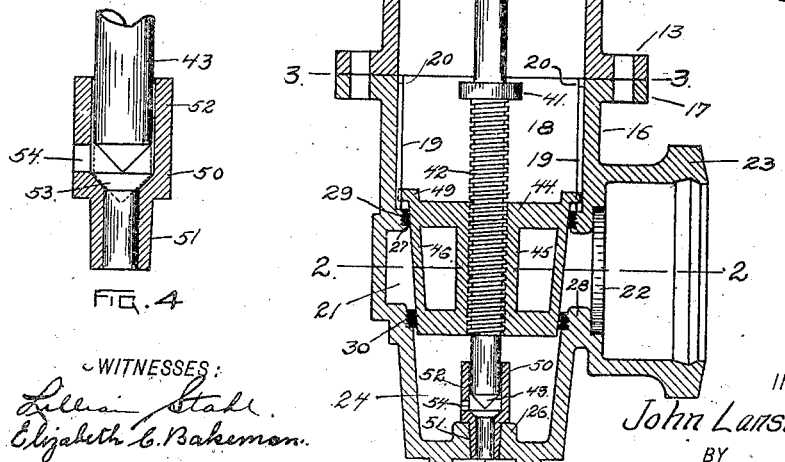

JOHN LANSING FULLER, OF SCHAGHTICOKE, NEW YORK.

HYDRANT AND VALVE THEREFOR.

979,941.  Specification of Letters Patent.  Patented Dec. 27, 1910.

Application filed August 19, 1910. Serial No. 577,932.

*To all whom it may concern:*

Be it known that I, JOHN LANSING FULLER, a citizen of the United States, residing at Schaghticoke, Rensselaer county, New York, have invented certain new and useful Improvements in Hydrants and Valves Therefor, of which the following is a specification.

My invention relates to hydrants such as are used for fire and other purposes, and particularly to those hydrants which have their main valves at their lower ends, so that they may be sunk below the frost line, when the hydrant is in position.
The object of my invention is to produce a simple, durable and economically constructed hydrant, having a balanced and self-grinding main valve, an efficient and reliable drip or waste outlet, and one of which the working parts are easily removable for repair or replacement.

Further objects of the invention will be pointed out in the specification, and separately claimed.
In the drawings, Figure 1 is a vertical section of a preferred form of my device; Figs. 2 and 3 are transverse sections through the planes 2—2, and 3—3, respectively of Fig. 1; Fig. 4 is an enlarged vertical section of a drip cup detached from the hydrant; Fig. 5 is a partial vertical section of the upper end of a hydrant, showing a modification.

Referring to Figs. 1 to 4 of the drawings, 11 designates a stand pipe formed with upper and lower flanges 12 and 13 for bolting the parts together, and with a nozzle 14, shown as provided with an ordinary coupling member 15. 16 is the bottom portion, formed with a bolt flange 17; an upper cylindric chamber 18 of the same diameter as the stand pipe 11 and having one or more, in the present instance two, inwardly extending, vertical ribs 19, the upper ends 20 of which are wedge-shaped; a central water chamber 21 connecting with a lateral water inlet 22, shown as provided with a hub end 23; a lower drip or waste chamber 24, having an aperture 25 in its lower end and a cylindric wall 26 thereabove; and two flanges 27 and 28 for supporting annular valve seats 29 and 30. 31 is a cover, having a bolt flange 32, an internally threaded stuffing-box 33, in which is a packing ring 34 and a threaded gland 35. Within the dome shaped body of the cover 31 is a concentric cylindric portion 36, inclosing a coiled extension spring 37, the function of which will hereafter appear. 38 is a valve stem, which passes centrally through the stuffing-box 33, cylindric portion 36, stand pipe 11, and nearly to the lower end of bottom portion 16. The stem 38 has a squared upper end 39, a spring engaging collar 40 and a stop collar 41 shrunk or otherwise secured thereon, a threaded portion 42 below the stop collar 41, and a preferably pointed lower end 43. On the stem 38 is a main valve 44, shown as comprising a central, interiorly threaded, cylindric portion 45, an outer tapered wall 46, spider arms 47, 48 connecting the parts 45 and 46 at their upper and lower ends, and one or more, in the present instance two, radially extending lugs 49 adapted to strike against and ride on the ribs 19 in the chamber 18. Two seat rings 29, 30, preferably either of brass or soft metal, are suitably secured one on each of the flanges 27 and 28, and form seats, respectively above and below the water chamber 21, for the taper valve 44. Within the lower chamber 24 of the bottom portion 16 is a drip cup 50, comprising a lower cylindric portion 51 snugly fitted within the wall 26, an upper cylindric portion 52 embracing the lower end 43 of the stem 38, and a tapered portion 53 connecting parts 51 and 52 and forming a valve seat closable by the pointed lower end of the stem 38; the upper wall being pierced by a lateral aperture 54.

The operation of this form of my device will be apparent from an inspection of the drawings, which show the hydrant in its closed or "shut-off" position. In operation, a wrench is applied to the polygonal head 39 of the valve stem 38. During the preliminary rotation of the stem, the spring 37, assisted by gravity, gives the stem a vertical downward movement until its lower end 43 engages the drip valve seat 53, thus closing the drip or waste outlet of the hydrant. The stem being thus prevented from further downward movement, now begins to move the main valve 44, which as it leaves its seats 29, 30, partakes of the rotary movement of the stem 38, and thus exercises a grinding action on the seats whereby the valve is rendered "self-grinding." As soon as the lugs 49 strike the ribs 19, the valve is held against further rotation, and moves vertically on the threaded stem until it reaches the stop collar 41. The water rises through the open valve, as well as around its outer wall 46, whereby the passage at this point is much greater than at the outlet 14. In closing the operation is of course reversed. The coiled spring 37 acts to hold the stem 38 in its down, waste closing, position until the main valve 44 is substantially seated, the valve making a half rotation until the lugs 49 engage with the opposite sides of the ribs 19 during its downward movement. The stem then rises against the action of the spring to the position shown in Fig. 1, in which the waste outlet is open, when a further fractional turn of the stem fully and firmly seats the valve. The valve 44 being of the open or "spider" pattern shown, permits all the water in the stand pipe 11 to pass to and through the waste outlet at the bottom of the hydrant.

To repair or replace any of the working parts, it is only necessary to relieve the packing ring 34 by slightly unscrewing the gland nut 35, and unbolt and remove the cover 31, when the stem 38 and valve 44 may be withdrawn from the standpipe 11. In replacing these, the upwardly wedged shaped ends 20 of the ribs 19 and the downward wedge shape of the lugs 49 insure the valve against being stopped in its downward movement, while the lugs act to center the stem and insure its lower end passing into the drip cup 50.

It will be seen that the main valve 44 is perfectly balanced in that the water chamber 21 entirely surrounds it; and that it may be closed against the highest practical pressure by reason of the fact that the flow is gradually restricted and is divided between the two annular spaces within the rings or seats 29 and 30 as the valve nears its seat.

In the modification shown in Fig. 5, the stand pipe 11 and all the parts below the upper end thereof may be as already described. The valve stem 61 is formed with a squared or non-cylindric head 62 of relatively considerable length just above the collar 40. The cover 63 may be like the part 31 of the former figures, except that its upper or stuffing box end is lengthened and internally threaded for engaging a threaded bushing 64, as well as for the gland nut 65, between which last named parts is placed the packing ring 66. A false or detachable valve stem head 67 is free as to rotation within the cover 63, being held as against vertical movement by a collar 68 on the head, which turns between the internal flange 69 in the cover and the bushing 64, which is provided with depressions 70 to receive a spanner for screwing it down to place. The head 67 has a squared upper end above the gland nut 65 for engaging a wrench. The head 67 has in its lower end a socket 71, in which the upper end 62 of the stem 61 has a sliding and non-rotative fit, the depth of the socket being substantially greater than the length of the part 62. A coiled extension spring 72 surrounds the lower end of the head 67 and bears as before upon the collar 40 on the stem 61.

It is obvious that the operations of opening and closing the hydrant will be as before described, except that the upper end of the valve stem has its limited vertical movement within the socket 71 instead of through the stuffing box, whereby the only wear on the latter is a rotary one.

It will of course be understood that many mechanical alterations may be made in my device, or in various parts thereof, without departing from my invention; and that certain parts of the device may be advantageously employed in combinations other than those shown.

What I claim is:

1. In a hydrant, a stand pipe; a bottom portion; a lateral inlet; a vertically movable main valve; a valve stem having rotary movement for raising and lowering said valve and a limited vertical movement with respect thereto; and a waste outlet in said bottom portion below said main valve including a valve seat and an aperture above said valve seat, said valve stem being constructed and fitted to engage said outlet valve seat and thereby to close said outlet.

2. In a hydrant, a stand pipe; a bottom portion; a lateral inlet; a vertically movable main valve; a valve stem having rotary movement for raising and lowering said valve and a limited vertical movement with respect thereto; and a waste outlet in said bottom portion below said main valve including a drip cup having an upper portion in which the lower end of said valve stem moves, a valve seat engageable by the lower end of said stem and a lateral aperture in the wall of said cup above said valve seat.

3. In a hydrant, a stand pipe; a bottom portion; a lateral inlet; a vertically movable main valve; a valve stem having rotary movement for raising and lowering said valve; a spring for giving said stem a limited vertical movement; and a waste outlet in said bottom portion below said main valve including a valve seat engageable by the lower end of said stem for closing said outlet.

4. In a hydrant, a stand pipe; a bottom portion; a lateral inlet; a valve stem; a hollow valve having threaded engagement with said stem for vertical movement thereon; a waste outlet in said bottom portion below said valve and closable by the lower end of said stem; and a spring operative to force said stem downward to its outlet closing position prior to its valve opening operation.

5. In a hydrant, a stand pipe; a bottom portion; a lateral inlet; a vertically movable main valve; a valve stem having rotary movement for raising and lowering said valve and a limited vertical movement with respect thereto; and a waste outlet in said bottom portion below said main valve including a valve seat closable by the lower end of said valve stem and forming a step or bearing for limiting the downward movement of said stem.

6. In a hydrant, a stand pipe; a bottom portion; a cover; a lateral inlet in said bottom portion; a valve-stem; a hollow valve having threaded engagement with said stem for a limited, initial, rotary movement and an operative, valve-raising, vertical movement thereon; and means for limiting the rotary movement of said valve, all the parts being so constructed and fitted that said valve and stem may be integrally removed from and replaced in said stand pipe after removing said cover therefrom.

7. In a hydrant, a stand pipe; a bottom portion; a lateral inlet; a valve stem; a taper valve having threaded engagement with said stem for a limited, initial, rotary movement and an operative, valve-raising, vertical movement thereon; a valve seat; and means for limiting the rotary movement of said valve, whereby said valve has a grinding action on said seat on entering and leaving the same.

8. In a hydrant, a stand pipe; a bottom portion; a lateral inlet; a valve stem; a taper valve having threaded engagement with said stem for vertical and rotary movement thereon; a valve seat; a vertical rib above said seat; and a lateral lug on said valve adapted to bear against said rib for limiting the rotary movement of said valve, whereby said valve has a grinding action on said seat on entering and leaving the same.

9. In a hydrant, a vertically movable valve having an imperforate, tapered, peripheral wall and a vertical water passage therethrough; a water chamber surrounding said valve; a lateral inlet to said chamber; and a valve seat above said chamber.

10. In a hydrant, a vertically movable valve having an imperforate, tapered, peripheral wall and a vertical water passage therethrough; a water chamber surrounding said valve; a lateral inlet to said chamber; a valve seat above said chamber; and means for permitting a partial rotation of said valve at the beginning of its operative, vertical movement, whereby said valve has a grinding action on said seat on entering and leaving the same.

11. In a hydrant, a stand pipe; a bottom portion; a lateral inlet; a vertically movable main valve; a vertically movable valve stem; a rotatable head above and engaging said stem for rotating the same; a spring for giving said stem a limited vertical movement with respect to said head; and a waste outlet in said bottom portion including a valve seat engageable by the lower end of said stem for closing said outlet.

JOHN LANSING FULLER.

Witnesses:
  Geo. L. Cooper,
  A. Fairweather.